US012406550B2

(12) United States Patent
Lipka et al.

(10) Patent No.: US 12,406,550 B2
(45) Date of Patent: Sep. 2, 2025

(54) SYSTEMS AND METHODS FOR MANAGING MONEY FROM MULTIPLE PLAYERS

(71) Applicant: CFPH, LLC, New York, NY (US)

(72) Inventors: Craig Lipka, Cresskill, NJ (US); Kenneth L. Miller, Ankeny, IA (US)

(73) Assignee: CFPH, LLC, New York, NY (US)

( * ) Notice: Subject to any disclaimer, the term of this patent is extended or adjusted under 35 U.S.C. 154(b) by 4 days.

(21) Appl. No.: 16/585,204

(22) Filed: Sep. 27, 2019

(65) Prior Publication Data

US 2020/0027309 A1 Jan. 23, 2020

Related U.S. Application Data

(63) Continuation of application No. 14/840,965, filed on Aug. 31, 2015, now Pat. No. 10,460,564, which is a continuation of application No. 13/790,325, filed on Mar. 8, 2013, now Pat. No. 9,123,202.

(60) Provisional application No. 61/644,693, filed on May 9, 2012.

(51) Int. Cl.
*G07F 17/00* (2006.01)
*G07F 17/32* (2006.01)

(52) U.S. Cl.
CPC ...... *G07F 17/3258* (2013.01); *G07F 17/3225* (2013.01); *G07F 17/3244* (2013.01)

(58) Field of Classification Search
None
See application file for complete search history.

(56) References Cited

U.S. PATENT DOCUMENTS 7,510,474 B2 3/2009 Carter
9,123,202 B2 9/2015 Lipka et al.
9,257,001 B2 * 2/2016 Angell .................... G07F 17/32
10,460,564 B2 * 10/2019 Lipka .................. G07F 17/3258
2002/0068629 A1 6/2002 Allen et al.
2003/0036428 A1 * 2/2003 Aasland ................ A63F 13/216 463/29
2003/0064807 A1 * 4/2003 Walker ................ G07F 17/3234 463/42
2003/0224852 A1 * 12/2003 Walker ................ G07F 17/3276 463/20
2004/0229671 A1 11/2004 Stronach
2006/0035694 A1 2/2006 Fuller
2006/0035696 A1 2/2006 Walker et al.
2007/0093296 A1 4/2007 Asher et al.
2007/0167210 A1 * 7/2007 Kelly .................. G07F 17/3232 463/16
2007/0298873 A1 12/2007 Nguyen et al.
(Continued)

FOREIGN PATENT DOCUMENTS

WO WO 2005/016471 2/2005

OTHER PUBLICATIONS

Notification of The International Search Report and the Written Opinion for International Application No. PCT/US2013/032105, mailed May 31, 2013 (9 pages).
(Continued)

*Primary Examiner* — Paul A D'Agostino

(57) ABSTRACT

Various embodiments that may generally relate to one or more games at one or more venues. Gaming at a venue may qualify a player for a bonus game. A pool from which awards are paid for winning the bonus game may be funded through gaming activity that is not at the one or more venues.

16 Claims, 2 Drawing Sheets

(56) References Cited

U.S. PATENT DOCUMENTS

| | | | | |
|---|---|---|---|---|
| 2008/0167129 | A1* | 7/2008 | Aaron | A63F 13/216 463/42 |
| 2009/0011824 | A1* | 1/2009 | Englman | G07F 17/3276 463/16 |
| 2011/0275425 | A1 | 11/2011 | Asher et al. | |
| 2011/0281627 | A1 | 11/2011 | Lutnick et al. | |
| 2013/0196753 | A1 | 8/2013 | Miller | |
| 2013/0273986 | A1* | 10/2013 | Arnone | G07F 17/3225 463/7 |
| 2014/0100023 | A1* | 4/2014 | Arnone | G07F 17/3227 463/25 |
| 2014/0179390 | A1* | 6/2014 | Kelly | G07F 17/3244 463/19 |
| 2015/0094129 | A1* | 4/2015 | Acres | G07F 17/3218 463/22 |
| 2015/0141122 | A1* | 5/2015 | Arnone | G07F 17/3204 463/25 |
| 2016/0012674 | A1* | 1/2016 | Chun | G07F 17/3293 463/13 |
| 2016/0098888 | A1* | 4/2016 | Andres | G07F 17/3293 463/22 |
| 2016/0210820 | A1 | 7/2016 | Lipka et al. | |
| 2016/0240040 | A1* | 8/2016 | Gnanasundram | G07F 17/3234 |
| 2016/0371935 | A1* | 12/2016 | Malek | G07F 17/3244 |
| 2017/0124812 | A1* | 5/2017 | Washington | G07F 17/3269 |
| 2018/0253929 | A1* | 9/2018 | Yee | G07F 17/3223 |
| 2020/0027309 | A1* | 1/2020 | Lipka | G07F 17/3225 |
| 2020/0410820 | A1* | 12/2020 | Ellis | G06Q 20/108 |

OTHER PUBLICATIONS

AU First Examiners Report for Serial No. 2013260131; dated Jan. 22, 2016; 3 pages.

AU Notice of Acceptance for Serial No. 2013260131; dated Feb. 19, 2016 ; 2 pages.

AU First Examiners Report for Serial No. 2016203596; dated May 9, 2017; 2 pages.

AU Second Examiners Report for Serial No. 2016203596; dated May 4, 2018; 2 pages.

CA Examiners Report for Serial No. 2873079; dated Jan. 7, 2019; 7 pages.

AU First Examiners Report for Serial No. 2018203038; dated Apr. 4, 2019; 3 pages.

NZ Examiners Report for Serial No. 701817; dated Aug. 5, 2015; 6 pages.

NZ Examiners Report for Serial No. 701817; dated Feb. 12, 2016; 6 pages.

* cited by examiner

SYSTEMS AND METHODS FOR MANAGING MONEY FROM MULTIPLE PLAYERS

CROSS REFERENCE TO RELATED APPLICATIONS

This application is a continuation of U.S. patent application Ser. No. 14/840,965 filed Aug. 31, 2015, which is a continuation of U.S. patent application Ser. No. 13/790,325 filed Mar. 8, 2013 (now U.S. Pat. No. 9,123,202), which claims the benefit of U.S. Provisional Application No. 61/644,693 filed May 9, 2012, the disclosures of which are hereby incorporated by reference herein in their entireties.

FIELD

Some embodiments may generally relate to gaming.

BACKGROUND

Events may be form the basis of a game on which money may be risked. Various events, such as horse races, other sporting events, casino games, non-sporting events, and so on may be played.

SUMMARY

The following should be understood as example embodiments and not as claims.

A. A method comprising: receiving, by a computing device, information about a first set of games that are based on one or more events, in which the one or more events are held at a venue, in which the first set of games are played by first players that are not located at the venue; based on the first players not being located at the venue, allocating, by the computing device, a portion of first money used to play the first set of games to a bonus pool to which players located at the venue may gain access; receiving, by the computing device, information about a second set of games that are based on the one or more events, in which the second set of games are played by second players that are located at the venue, in which no portion of second money used to play the second set of games is allocated to the bonus pool; based on the second players being located at the venue, allocating, by the computing device, bonus currency to the second players, in which the bonus currency may be used by the second players to play a bonus games that may win at least part of the bonus pool; receiving, by the computing device, a request to play a bonus game using the bonus currency from one of the second players, in which the request identifies a winning condition of a second event held at the venue; and determining, by the computing device, an outcome of the bonus game, in which the one of the second players wins money from the bonus pool if the winning condition occurs in the second event.

A.1. The method of claim A, in which the request to play the bonus game is a wager of an amount of bonus currency that the winning condition will occur, in which the winning condition includes at least one guess at a winner of a race. A.2. The method of claim A, comprising: determining a date at which the bonus currency expires if the bonus currency is not used and identifying the date to the one of the second players.

A.3. The method of claim A, comprising: determining that the second event is eligible to be a basis of the bonus game and allowing the use of bonus currency to play the bonus game on the second event in response. A.3.1. The method of claim A.3, in which determining that the second event is eligible includes determining that the second event is a last event of a day held at the venue, and in which the method includes preventing use of the bonus currency on other events of the day. A.3.2. The method of claim comprising: determining that no one wins a bonus game based on the second event and carrying forward a balance of the bonus pool to a future event on which a future bonus game may be based. A.3.2.1. The method of claim A.3.2. comprising: determining that a bonus pool must be won on the future event; determining that no one wins a bonus game based on the future event; and awarding the bonus pool to at least one player of the bonus game based on the future event that did not win based on a determination that the bonus pool must be won on the future event. A.3.3. The method of claim A.3, in which non-bonus games may be played based on the second event with non-bonus currency.

A.4. The method of claim A, in which any event qualifies to be a basis of the bonus game. A.5. The method of claim A, comprising: requiring that the bonus game be a wager with a particular risk characteristic. A.5.1. The method of claim A.5, in which requiring that the bonus game be the wager with the particular risk characteristic includes requiring that the bonus game be a superfecta wager. A.6. The method of claim A, comprising: based on the first players not being located at the venue, not allocating any bonus currency to the first players. A.7. The method of claim A, in which a respective amount of bonus currency allocated to each second player is proportional to an amount risked by each respective second game that is a winning game played by the second player, in which the bonus currency is not exchangeable for a monetary value, and in which the bonus game may not be played without using bonus currency.

A.8. The method of claim A, comprising: determining that no portion of the second money should be allocated to the bonus pool based on the second set of games being played at the venue. A.8.1. The method of claim A.8, comprising determining the location based on at least one of a GPS coordinates of devices used to play the second games and a network through which the second games were played. A.8.2. The method of claim A.8, in which the second set of game are played through the venue. A.8.3. The method of claim A.8, in which determining that no portion of the second money should be allocated to the bonus pool includes determining that no portion of the second money should be allocated to the bonus pool based on the second set of games being played at the venue and through a approved gaming provider. A.8.3.1. The method of claim A.8.3, comprising allocating a portion of third money used to play a third set of games to the bonus pool based on the third set of games being played at the venue and with an unapproved gaming provider.

A.9. The method of claim A, in which bonus currency includes points that may be used to play the bonus game. A.10. The method of claim A, in which the first set of games are first wagers related to one or more horse races run at the venue and the second set of games are second wagers related to the same one or more horse races. A.10.1. The method of claim A.10, in which the first money is money risked in the first wagers and the second money is money risked in the second wagers. A.11. The method of claim A, in which the portion differs for each game based on a riskiness of the game and the method comprises determining the portion.

B. An apparatus comprising: a computing device; and a non-transitory medium having stored thereon a plurality of instructions that when executed by the computing device cause the apparatus to: receive information about a first set of games that are based on one or more events, in which the one or more events are held at a venue, in which the first set of games are played by first players that are not located at the venue; based on the first players not being located at the venue, allocate portion of first money used to play the first set of games to a bonus pool to which players located at the venue may gain access; receive information about a second set of games that are based on the one or more events, in which the second set of games are played by second players that are located at the venue, in which no portion of second money used to play the second set of games is allocated to the bonus pool; based on the second players being located at the venue, allocate bonus currency to the second players, in which the bonus currency may be used by the second players to play a bonus games that may win at least part of the bonus pool; receive a request to play a bonus game using the bonus currency from one of the second players, in which the request identifies a winning condition of a second event held at the venue; and determine an outcome of the bonus game, in which the one of the second players wins money from the bonus pool if the winning condition occurs in the second event.

DETAILED DESCRIPTION

I. Example Embodiments

Figure 1:
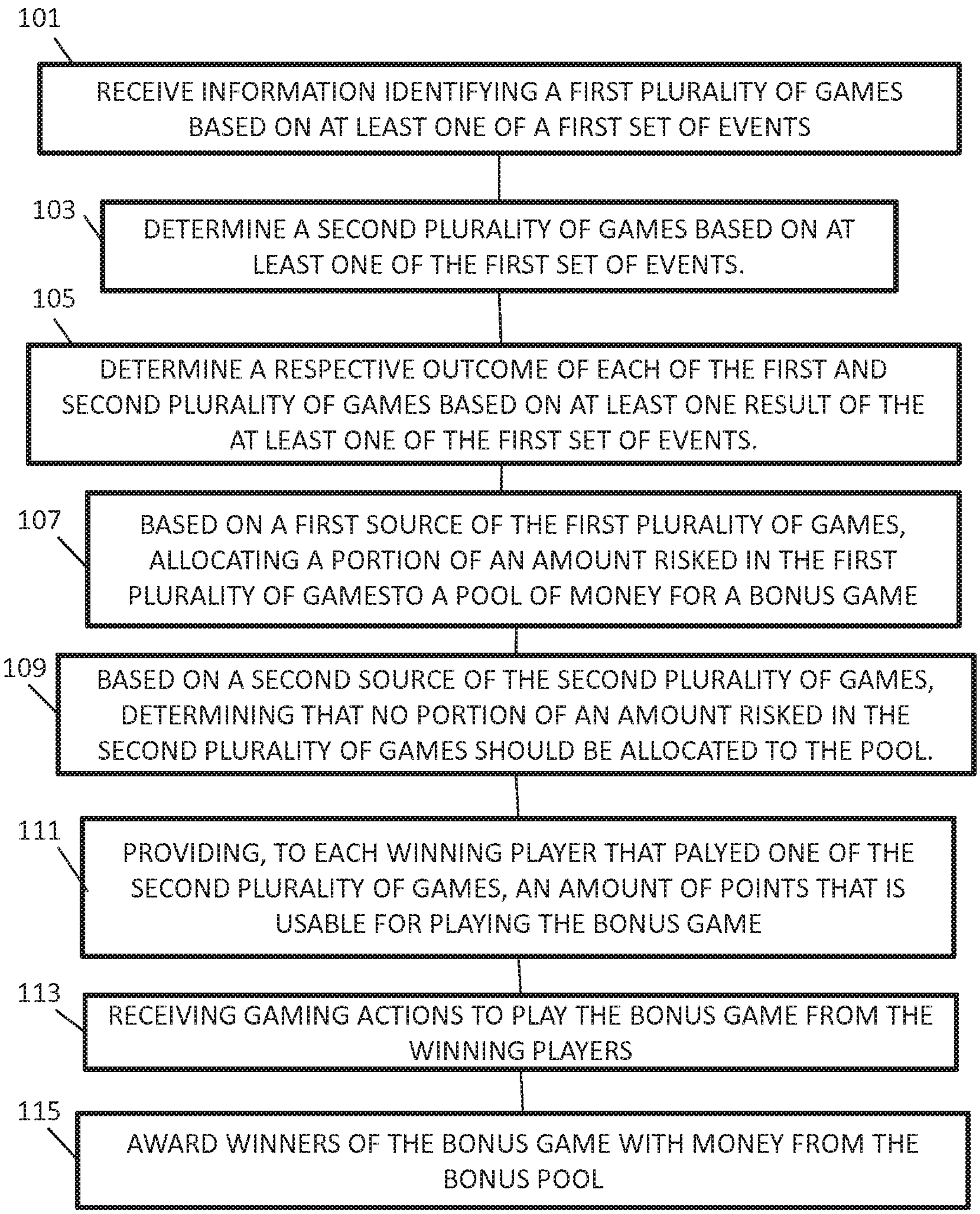
FIG. 1 shows an example method that may be performed in some embodiment

Colloquially, gaming may be referred to as wagering but it should be understood that embodiments are not limited to the statutory definition of wagering that is limited to games of chance but rather may include games of skill, fantasy games, games of chance, and/or any other type of games, and therefore the term gaming may be used when discussing some embodiments rather than the term wagering. Gaming may include a risk of an amount of money that some event will happen. Such risk may be skill and/or risk based, booked and/or pari-mutuel, and/or take any form desired. Gaming may include paying a fee to enter into a contest that is based on the occurrence of an event. The winner of such a contest may be provided with an award (e.g., money based on a sum of contest entry fees). Wagering may be used herein to refer to such skill or risk based gaming in some instances and should not be understood to be limited to one or the other type of gaming unless specified otherwise. Gaming may include wagering, betting, risking money, paying an entry fee to a contest, and/or any other form of gaming as desired. Various embodiments may apply to any type of gaming in any combination and/or arrangement.

Some embodiments may include facilitating game play related to one or more events at one or more venues. Some embodiments may include managing money used to play games by a plurality of players. The players may play games at a venue where an event is being held, through a third party, remote from the venues, at an off-track gaming facility, through an online gaming provider, and so on. In some embodiments, a portion of money used to play games by at least some players may be used to fund some gaming option that may be available to a subset of players. For example, players may qualify for such a gaming option by performing a specific action (e.g., taking a game action (e.g., placing a wager) at a venue where an event is being held, taking a gaming action with a preferred gaming operator, winning a game on a set of events, and so on).

For example, in some embodiments, one or more horse races may be held at a race track over some period of time. If a player plays a game (e.g., places a wager) based on the one or more horse races at the race track and/or wins such a game during that period of time, the player may be qualified for a gaming option (e.g., wager) that may not otherwise be available. Additional players may play games through off-track providers (e.g., websites, off-track gaming facilities) on the same event. A portion of money used to play those games may be placed into a pool for the gaming option that the player is qualified for by playing the game at the race track. The other players (e.g., because they did not play the game at the track and/or do not win such a game) may not be qualified for that wagering option. The player may at some point exercise the gaming option to play a game that relates to some other event (e.g., a last race of a day). The player may win money from a pot funded by other players if the player wins the gaming option.

Although some examples herein may be given in terms of a horse racing environment, it should be recognized that such an environment is given as a non-limiting example only. Various embodiments may include any types of events, such as political events, casino games, sporting events, card games, board games, fantasy games, reality show outcomes, and so on. Various embodiments may include any type of race, such as human races and dog races. Various embodiments may include any type of venues, such as hosting venues, primary gaming venues, casinos, race tracks, sports arenas, bingo halls, sports lottery facilities, lottery facilities, and so on.

It is recognized that players may have shifted their gaming activity from on site or live gaming to remote gaming (e.g., gaming through the internet or at off-site gaming facilities). Some embodiments may include incentives for players to shift their gaming activity to on-site gaming. For example, a bonus game may be offered to on-site players that is funded by off-site players.

Some embodiments may include a gaming provider. A gaming provider may include casinos, a sports book, a totalizer, a (sports) lottery provider, a horse racing establishment, a fantasy sports operator, and so on. A gaming provider may include one or more computing devices that may take gaming related actions such as accept money (e.g., money risked in a game, money paid as a contest entry fee, money wagered), audit events, verify users, determine outcomes, track results, receive information, maintain account information, transmit information, maintain pari-mutuel pools, determine odds, and/or perform any desired actions. Such a computing device may include a server operated on behalf of a gaming provider.

Some embodiments may include one or more user devices. Such devices may allow users to interface with a gaming operator to play games, view information about games, access account information, view results, take game related actions, and so on. Such user devices may include smart phones, other cell phones, tablets, personal computers, kiosks, devices operated by gaming provider personnel, and so on.

FIG. 1 illustrates an example method that may be performed in some embodiments. It should be recognized that this example method is given as a non-limiting example only. Other embodiments may include no method, a different method, a differently ordered method, a method with alternative actions, a method with different actions, a method with additional actions, and so on. In some embodiments, such a method may be performed by a gaming operator (e.g., a venue, a gaming server of a venue, a totalizer, a combination of entities, and so on).

Some embodiments may include receiving information identifying that a first plurality of games have been played based on at least one of a first set of events as indicated at block 101. For example, a totalizer such as that run by AmTote may collect information about wagers that may be placed from a plurality of different locations. For example, games may be played at one or more off track gaming facilities, race tracks, internet gaming portals, mobile device gaming operators, and so on. Money risked in gameplay may be totaled, tracked, accounted for, acted on, and so on by a totalizer and/or other entity such as a gaming operator. Game information (e.g., indications of game actions, game outcomes, etc.) may be transmitted to a venue or other gaming operator from such a totalizer and/or may be transmitted from such a gaming operator to a totalizer as desired and in accordance with a desired arrangement of components in various embodiments.

In some embodiments, some or all money risked on games that relate to a same event may be pooled into one or more pari-mutuel pools. Pari-mutuel gaming is well known in the art and one of ordinary skill in the art would understand the various forms that such gaming may take. In some embodiments, some or all money risked on games that relate to a same event may be booked by a gaming operator. Booked gaming is well known in the art and one of ordinary skill in the art would understand the various forms that such gaming may take.

A totalizer may perform the method of FIG. 101, some actions of such a method, and/or may not be involved in such a method at all. For example, rather than a totalizer, a gaming operator such as a venue may perform such a method and/or actions related to such a method. For example, rather than a totalizer, a venue may collect such information directly. It should be recognized that what or where such an action is performed is not limiting and that examples of a totalizer and/or other gaming operator (e.g., gaming server of a gaming venue) are given as examples only.

In some embodiments, games may be played through a first set of game portals, which may be referred to as sources (or wager or game or money sources). Such portals may accept money risked by players of games. Such game portals may include off track gaming facilities, other venues than a venue hosting an event, casinos, sports books, internet gaming portals, and so on. In some embodiments, such game portals may include any manner or place through which a user may take gaming actions (e.g., risk money) on an event. Such portals may include locations other than a venue that is hosting the event.

Games, for example, may include a specific type of game, and/or any game depending on a desire of a gaming operator (e.g., certain types of games may qualify for treatment of such a method such as those that have a house take above or below a certain percentage while others may not qualify). It should be recognized that any manner of determining how to treat a game based on a characteristic of the game (e.g., source of money risked, type of the game, etc.) may be used to determine how to treat such a game. A game for example may include an exacta game, a win place or show game, and so on through which a player may risk money that an outcome in one or more events may occur. For example, a player may play a win game by selecting a horse that the player thinks will win in a race and risking an amount of money that that horse will win for a chance to win more money if that horse does win.

A first set of events may include any desired number, combination, and/or type of events. For example, a first set of events may include events taking place on a day at a race track. As another example, a first set of events may include events taking place in a competition that may be held in one or more locations (e.g., the set of triple crown races, one particular day of the triple crown races).

Some embodiments may include determining that a second plurality of games have been played based on at least one of the first set of events as indicated at block 103. For example, some embodiments may include receiving information about money risked in play of such games from players (e.g., receiving by a race track through a kiosk, teller, mobile device, receiving by a totalizer from a source such as a race track hosting the event, receiving wagers and/or wager related information). In some embodiments, such determination may be made in response to receiving such money related information from players (e.g., by a gaming operator and/or totalizer).

In some embodiments, the first plurality of games and the second plurality of games may differ from one another based on a source of the games (e.g., the first plurality may be related to off track/venue game actions and the second plurality may be related to on track or venue game actions). It should be recognized that such differences are given as non-limiting examples only and that in some embodiments such differences may include a type (e.g., trifecta may qualify, but other games may not qualify for bonus points), a preferred or non-preferred source (e.g., from a partner vs. a non-partner source), a game risked amount (e.g., games in which money over a threshold amount is risked may qualify for bonus points, but otherwise may not), a player characteristic, etc.

Some embodiments may include determining a respective outcome of each of the first and second plurality of games based on at least one result of the at least one of the first set of events as indicated at block 105. For example, some embodiments may include receiving information identifying an outcome of each of a plurality of races (e.g., from a race track, from a system designed to record outcomes of a race, from a staff member watching the race at a race track, from a third party information provider, and so on). Such information may be used to determine whether one or more of the games are winning or losing games. For example, a race track, totalizer, and/or game source may use result information to determine if a game wins when a result occurs (e.g., if a wager identifies a correct actual winner or other actual resulting situation).

Some embodiments may include, based on a first source of the first plurality of games, allocating a portion of an amount risked by the first plurality of games to a pool of money for a bonus game as indicated at block 107. For example, in some embodiments, games that are played off of a track (e.g., games for which money is risked through a mobile device not located on a track, through an off track gaming facility, through an internet gaming portal, etc.) may have a portion of money associated with such games allocated to a pool of money for a bonus game. Such a pool may be referred to as a bonus pool. A bonus pool may be accessed by players at a venue by using bonus points earned through gaming activity at the venue to play a bonus game.

In some embodiments, a venue may allow games based on events at the venue to be played through such remote sources. Such sources may pay some fee for to the venue for allowing those games to be played (e.g., a 3%, 9%, 12%, flat fee, and so on fee for the ability to broadcast race information and/or accept money risked on games). Such a fee may be allocated by a totalizer, paid by a remote source, allocated by a gaming provider, and so on. A portion of such a fee that is due to a venue may be allocated to a bonus pool for a bonus game. For example, 1% of such a fee, 1% of the money risked or otherwise spent in gameplay, all of such a fee, and so on may be allocated to a pool for a bonus game. In some embodiments, a portion may differ depending on a source (e.g., some sources may be associated with one level for allocation and another source may be associated with a different level of allocation). Such a level of allocation may be related to an amount of a fee, a business partnership with a source, and so on.

Such money may be allocated by a totalizer, a gaming operator, and so on that may be performing one or more portions of such a method as that in FIG. 1. Some embodiments may include allocating money to such a pool from a plurality of games from a plurality of sources over a plurality of events. For example, money related to a game played by a first player through an internet gaming portal that is based on a first race may be allocated to the pool along with money related to a game played by a second player through an off track gaming facility that is based on a second race.

In some embodiments, to facilitate such allocation, a determination of a source may be performed. A source may be reported to a gaming operator or other entity performing a method such as that of FIG. 1 by a source itself (e.g., when reporting the gameplay).

In some embodiments, a location of a player when a game action is taken may define a source and/or may otherwise by used to determine how to allocate money to a bonus pool. For example, a source may include a location at which a game action is taken (e.g., a wager is placed). A mobile device may be used to take a game action. If that device is on a grounds of a race track, then allocation to the pool may not be performed. If that device is off of a grounds of a race track, then allocation to the pool may be performed. Accordingly, some embodiments may include determining a location of the mobile device (e.g., receiving GPS coordinates, determining if the device is connected to a Wi-Fi network that spans the grounds, determining a location based on IP location, determining a location based on a geofence, etc.). Some examples of a mobile device operation that may be used in some embodiments is described in U.S. patent application Ser. No. 13/780,157, which is hereby incorporated herein by reference.

Some embodiments may allow money risked in a game to not be allocated to a bonus pool and/or may allow a player to earn bonus gameplay if game actions are taken on the grounds and/or through an approved gaming source (e.g., an application related to the venue). Risked money may be allocated to a bonus pool and/or not earn bonus gameplay if it is performed through other wagering sources (e.g., through generic internet portals) and/or at a location off of a property of a venue. It should be recognized that any method of location determination and/or source determination may be used in various embodiments. Various examples of location and/or source determination are known in the art (e.g., GPS, geofencing, IP address, etc.).

Some embodiments may include, based on a second source of the second plurality of games, determining that no portion of the second plurality of money risked through play of the second games should be allocated to the pool as indicated at block 109. For example, in some embodiments, games that are played at a race track and/or through some approved source may be excluded from such allocation. Accordingly, games that are played off of the track may be subject to such allocation but games that are played at the track may not be subject to such allocation. As discussed elsewhere some embodiments may include determining a location and/or source of a game to facilitate a determination regarding whether to make such an allocation or not.

Although some embodiments are described as including and/or excluding from such allocation some games (e.g., some money risked through gameplay), it should be recognized that such examples are given as non-limiting examples only. Some embodiments may allocate based on location, based on source, based on amount risked, based on type of game, based on riskiness of game, and so on and may exclude from such allocation based on such characteristics in any combination as desired. Some embodiments may include allocating related to all games, allocating related to certain types of games, no such allocating (e.g., a pool or payout funded in another manner), differently arranged allocation, and so on. For example, in some embodiments all games may be subject to such allocation but only certain game may earn bonus gameplay abilities.

Some embodiments may include providing, to each winning player in one of the second plurality of games, an amount of points that is usable for a bonus gaming option (e.g., a wager that has its payout funded by the bonus pool). Accordingly, each of these players may be given a chance to play a bonus game even though they may not have contributed to the bonus pool. An amount of points provided to the winning players may be based on an amount won by the winning players, an amount risked in a winning game by the winning players, a flat amount, an amount based on a number of games played by the winning players, an amount based on a type of game played by the winning players (e.g., more points for more risky games), and so on. For example, an amount may be equal to an amount risked (e.g., $2 provided in response to a $2 wager), an amount may be increased for a low probability game (e.g., $4 in points provided in response to a $2 trifecta game), and so on. It should be recognized that any manner of determining points may be used in various embodiments.

It should be recognized that while points may be referred to in dollar values that such naming convention is given as an examples only. For example, rather than $4 in points, 4 points may be provided. Points may or may not have a monetary value. For example, in some embodiments points may be referred to as dollars, but may not actually have any monetary value and may only be used to place bonus wagers. In some embodiments actual dollars may be used. Such dollars may be assigned to an account that may be limited to use in play of a bonus game. It should be recognized that examples of bonus points and/or dollars are given as non-limiting examples only. Various embodiments may include any manner of providing one or more a player with a fixed and/or variable ability to play one or more bonus games.

It should be recognized that while some examples are given in terms of winning players, that other embodiments may include all players, losing players, players that play and/or win a particular type of game, and so on. For example, for each superfecta game played by a player at a track, that player may be given an amount of points equal to the bet amount regardless of an outcome of the game.

Examples of earning and/or otherwise being awarded bonus game play options are given as non-limiting examples only. In some embodiments players regardless of source and/or location may earn such bonus play ability. In some embodiments, however, allocation into a bonus pool may be only done for players that are from certain sources. In some embodiments, bonus play may be limited to use at a venue and/or through a preferred source. It should be recognized that various embodiments may include different arrangements of bonus play ability, bonus denominating, bonus allocation, bonus earnings, allocation regimes, and/or other components that may related to game play.

Points and/or any other bonus game play ability may be provided by a gaming operator, a totalizer, and so on. For example, in some embodiments, a totalizer may maintain balances for each player. The totalizer may include a balance of points that are eligible for use in the bonus game that may be adjusted in response to a game winning, a game action being taken, and so on. Such a totalizer may also maintain and/or adjust other balances (e.g., gaming account used to take gaming actions, account into which winnings are deposited, etc.). In some embodiments, such providing and/or maintenance may be performed by a gaming operator separate from and/or in connection with a totalizer.

In some embodiments, players that placed the first set of games may not be provided with any points. For example, such players may be players that are off of the track and therefore not eligible for a bonus game. Such players may earn such points by playing games on the track rather than off the track and/or otherwise complying with point eligibility rules of a particular embodiment. In some embodiments, players that play games through different sources may be allocated different amounts of points than each other and/or players that play games at a venue where an event occurs. For example, off-track games maybe awarded half of the points of on-track games.

In some embodiments, points may have an expiration date. For example, points may last until an end of a day, an end of a competition that a game based on event is part of, an end of a season, an end of a week, an end of a year, and so on. If such points are not used by such time, the points may be eliminated from a player's account. A gaming operator and/or totalizer may track such points, the use of such points, expiration of such points, and so on such that a balance of points may be adjusted accordingly. In other embodiments, points may not expire.

Some embodiments may include allowing a winning player to play a bonus game (e.g., place a wager of points that if won is paid from a bonus pool). A bonus game may include a game that is based on a last event of a day, week, month, competition, and so on. A bonus game may be required to be a particular type of game (e.g., a parlay game, a superfecta game, a trifecta game, a game with a particular risk level, and so on). Different bonus games (e.g., on different days) may have different requirements (e.g., different games required on different days). A gaming operator or other entity may make a determination of the requirements for a particular bonus game (e.g., on a particular day). A bonus game may allow a player who has been awarded points to use those points as a currency for the bonus game. A winner of the bonus game may receive an amount of money from the bonus pool into which money from the first plurality of games has been allocated. Allowing such play of games may include accepting risked money (wagers, contest entry fees, etc.) from devices such as kiosks, mobile devices, teller systems, and so on.

Some embodiments may include accepting such risked money and/or allowing such gaming actions during a specific time. Such a time may be related to when points expire, when a game that resulted in points being provided to the player occurred, an end of a competition, an end of a day, and so on. For example, such a bonus game may be required to be played (e.g., if at all, to avoid losing points) by an end of a day on which the points are earned. In some embodiments a bonus game may be required to be played before one hour before the final race of the day on which the game that was won to earn points was played. Accordingly, players may be encouraged to remain at a track to play such a bonus game. In some embodiments, such points may be required to be used on a different day than when they are earned (e.g., thereby encouraging the player to return to the track to play the game on a different day). In some embodiments, there may be no such requirement (e.g., the points may be used any time before the even on which the bonus game is based starts and/or gaming is otherwise closed such as in a in running type game). Some embodiments may include determining whether a time or other criteria are met for the use of points and in response, allowing or disallowing a bonus game to be played using the points.

Some embodiments may include receiving bonus game actions using the points awarded to players. For example, a gaming operator and/or totalizer may receive indications of bonus game actions (e.g., that meet any required criteria if any such as being a particular type of game) from devices (e.g., mobile devices, kiosks, teller devices, etc.). An example of this is indicated at block 113. In some embodiments, an amount of the points may be put into play in a bonus game (e.g., risked like money in a wager, used as a contest entry fee, etc.). Accordingly, in some embodiments, a player may play any number of bonus games using the points in any combination (e.g., $1 of points on horses 1, 2, and 3 and $2 on horses 2, 4, and 6) similar to a manner in which money may be used for traditional gameplay. An account of such points may be reduced in response to points being used to play bonus games. A player playing a bonus game may be required to meet criteria for that game (e.g., be in an approved location, place a minimum, maximum, risk a required amount on a bonus game, play a particular type of game as the bonus game, etc.). A balance of bonus points may be adjusted in response to playing a successful and/or unsuccessful bonus game to reflect the points used to play the game.

In some embodiments, a bonus game may be closed to currency that is not the points (or some other denomination of bonus game playability such as money in a special account). For example, no cash or other money may be used to play a bonus game. Accordingly, the bonus game and/or bonus pool may be limited to those players that earned points through the play of qualifying games, winning such games, any/or otherwise earning points.

Some embodiments may include awarding one or more winners of a bonus game as indicated at block 115. For example, if a player correctly chooses the winner(s) of an event as play of a bonus game, the player may be awarded from the bonus pool. The bonus pool may be treated substantially similar to a pari-mutuel pool. For example, the pool may be split among any winners in proportion to an amount of points that the winners risked. A gaming operator and/or totalizer may adjust a balance of an account in response to a player winning a bonus game.

It should be recognized that while some embodiments have been described as including a pari-mutuel style bonus pool, that such embodiments are given as non-limiting examples. For example, some embodiments may include bonus games that are booked games rather than pooled games. A bonus pool may be used to if at all in such an example to determine a payout for a game and/or to compensate a booker of the bonus games.

In some embodiments, if no player wins a bonus game for a particular event (e.g., a bonus game that is limited to the end of a day), the bonus pool may roll over to a next bonus game (e.g., a bonus game that may be played at the end of a next day). Accordingly, the bonus pool may grow over time if players do not win the bonus game. In some embodiments, characteristics of a bonus game may be selected to so that it is expected that the pool will grow. For example, the game type may be limited to a superfecta or other game that is difficult to win so that there is expected to be few winners and therefore the pool is expected to grow over time.

Some embodiments may include an end point for rolling over a bonus pool. For example, in some embodiments, at the end of each month, at the end of each competition, at the end of each day, and so on a pool may be required to be awarded. For example, no roll over may occur, roll over until a maximum pool amount may occur, roll over until a last day of a month may occur, and so on. If no player wins the bonus pool, before such an end point, second place or non-winning players may be awarded the bonus pool. For example, players that get three out of four correct in a superfecta in a final bonus pool game may be awarded if no players get all four correct.

It should be recognized that FIG. 1 is illustrated as a non-limiting example only. Other embodiments may include alternative, different, same, more, fewer, differently ordered, none, all, and so on of the actions as illustrated in FIG. 1.

According to some embodiments that may include a method such as that illustrated in FIG. 1, players may be encourage to game at a track rather than off of a track. Gaming on a track may provide a track owner with additional revenue. For example, players that game on the track may earn points (e.g., for a win or game action) that may be used to play a bonus gamer. The bonus game outcomes may be funded, at least in part, by games or fees that may be due to the track from games played off of the track (e.g., simulcasting fees, percentages of the games played off-track, etc.). Accordingly, even though players off of the track may be responsible for funding a bonus pool, such players may not have access to a bonus game and even though players on the track may not be responsible for funding a bonus pool, such players may have access to the bonus game.

Figure 2:
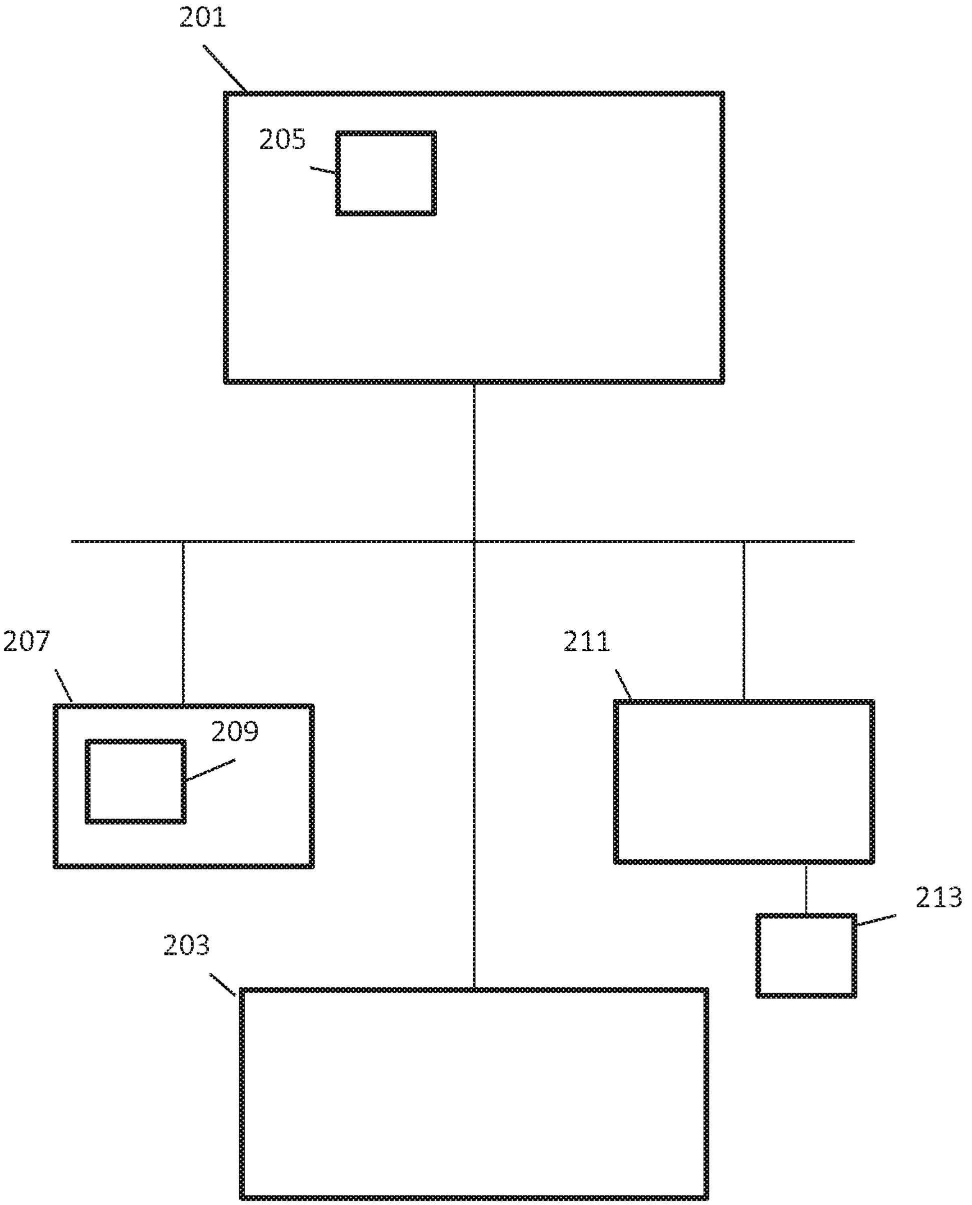
FIG. 2 shows an example of some embodiments.

FIG. 2 illustrates an example of some embodiments. For example, FIG. 2 illustrates a venue 201 at which one or more events may take place. FIG. 2 illustrates a totalizer 203 that may act to maintain wagers related to the one or more bets from a plurality of sources. FIG. 2 illustrates a player 205 located at the venue who may take game actions related to the one or more events. FIG. 2 illustrates an off track gaming facility 207 at which one or more players may play games based on the one or more events remotely from the venue. FIG. 2 illustrates a player 209 located at the off track gaming facility who may take one or more gaming actions related to the one or more events remotely from the venue. FIG. 2 illustrates an internet gaming portal 211 through which one or more players may play games based on the one or more events remotely from the venue. FIG. 211 illustrates a player 213 that may play games through the internet gaming portal based on the one or more events held at the venue. It should be recognized that this example structure and/or these example components are given as a non-limiting example only.

Venue 201 may include a horse track, a casino, a sports book, a wagering facility, a sporting venue, a stadium, and so on. It should be recognize that various embodiments are not limited to any particular venue. It should be recognized that various embodiments are not limited to a single venue, but rather may include multiple venues (e.g., related to a single gaming operator, at which events occur, that may offer a competition through a totalizer, and so on). For example, a set of sports books may operate such a sports book bonus pool for games at the sports book vs. games placed using mobile devices away from the sports book.

Venue 201 may include a gaming server and/or one or more other computing devices that may perform one or more actions such as those of FIG. 1. For example, such a computing device may include a kiosk, a teller computer, a mobile device of a user, and so on. Such a computing device may display a gaming interface, display balance information, accept money risked in gameplay, transmit information, maintain balance information, communicate with a totalizer, determine outcomes, display information about outcomes, and so on. For example, in one example, a mobile device of a user may risk money by taking one or more game actions through a router or other network component that operates a gaming network at the venue. A gaming action may be taken by transmitting information through the network to a totalizer. The information may identify that the mobile device is located at the venue (e.g., an IP address, a GPS location, a network ID to which the device is connected, a username and/or password that is associated with the venue, and so on. Such information may be used to determine allocation of bonus points and/or money into a bonus pool. A system of such a venue may perform a method of FIG. 1 and/or some other method that may encourage players to game at the venue rather than off the venue. Such a method may be performed solely by such a system and/or in connection with a totalizer and/or other component of FIG. 2 or otherwise.

Totalizer 203 may include may include a system such as one provided by AmTote International of Hunt Valley, Maryland. Such a system may include one or more computing devices. Such a system may receive information from one or more venues, one or more other gaming sources, and so on. Such a system may maintain balance information, pool information, and so on. Such a system may accept wagers, determine outcomes of wagers, adjust balance in response to game actions, adjust balances in response to outcomes, and so on. Such a system may receive outcome information from a venue, may assign bonus points, may allow users to use bonus points, may maintain a balance pool, may award money in response to a bonus game outcome, and so on. Such a system, in some embodiments, may perform a method such as that of FIG. 1 or otherwise to facilitate a bonus game that may encourage players to play at the venue 201 rather than off the venue. Such a method may be performed solely by such a system and/or in connection with a device of a venue and/or other component of FIG. 2 or otherwise.

Player 205 may include a player at a venue 201. For example, such a player may use a mobile device (e.g., a cell phone), a kiosk, a teller, and so on to play games related to one or more events. Such a player may earn points to play bonus games through such gaming activity at the venue and may play bonus games using such points.

Off track gaming facility 207 may include a facility that is located remote from the venue that may allow players to take gaming actions related to events at the venue. For example, a player may use a device at such a facility and/or act through a teller at such a facility to risk money through play of one or more games. The facility may transmit information identifying such game play to a totalizer and/or venue that may utilize such information (e.g., place risked money into a pool for an event, allocate money to a bonus pool, and so on). For example, in some embodiments, some portion of risked money may be placed into a pari-mutuel pool for an event, some portion of risked money may be allocated to the venue (e.g., as a simulcast fee), and/or some portion of the risked money may be allocated into a bonus pool. The portion allocated into the bonus pool may come from the portion that would otherwise be allocated to the venue in some embodiments. A totalizer and/or device of a venue may perform such allocating according to a desired arrangement of an embodiment.

Player 209 may include a player located at an off track gaming facility. Such a player may take one or more game actions using a computing device (e.g., kiosk, mobile device) and/or through a teller (who may use a teller computer). A game action may be part of a game that relates to an event at the venue. A portion of money risked through play of such games may be allocated to a bonus pool that the player may not be eligible for because they are not gaming at the venue. Information about such games may be transmitted from such a device to a totalizer and/or device of a venue for allocation and/or other uses.

Internet gaming portal 211 may include a system through which a player may take one or more gaming actions through a webpage or other electronic interface. For example, such a system may present a webpage to a user that allows the user to login to an account and risk money in game play on an event at the venue. Such a portal may allow a player to play games from their home, from anywhere where remote wagering is legal, and so on. A portal may receive game actions and may transmit information about such game actions to a totalizer and/or system of a venue for use in a pool and so on.

Player 213 may include a player that uses internet gaming portal 211 to play one or more games. For example, such a player may log into the internet gaming portal through a user device (e.g., personal computer, cell phone) and operate an interface to play one or more games. Information about such game actions may be transmitted from such a device to a totalizer and/or device of a venue for allocation and/or other uses.

In some embodiments, a source of a remote game play (e.g., an internet gaming portal and/or off track gaming facility) may receive a cut of money risked in game play. For example, some percentage of each dollar risked in games may be allocated (e.g., by a totalizer, by the source, and/or by system of a venue) to the source. Similarly, a totalizer may be allocated some payment for totalizing services. Such payment may be a portion of the amount risked in gameplay.

It should be recognized that while some embodiments have been described to include allocating portions of amounts risked in gameplay, that such examples are given as non-limiting examples only. Other embodiments may include allocating a portion of money lost, a portion of money won, a portion of money for games of a certain type, no money related to games, a flat fee, and so on.

Some embodiments may include a communication network through which one or more components may communicate. For example, such a communication network may include the Internet, a LAN, and so on. Information related to wager, bonus games, allocations, and so on may be transmitted through such communication networks.

It should be recognized that FIG. 2 is given as a non-limiting example only. Other embodiments may include any arrangement and or combination of elements as desired. For example, some embodiments may include multiple venues (e.g., game play at any such venue related to events at any venue may qualify for a bonus game and/or earn points), not include a totalizer (e.g., a device at a venue may perform traditional totalizer services), include additional off site gaming options, include location detection functionality (e.g., geofencing, gps) that may allow a determination of a location of a player for allocation purposes, and so on.

In one example, a 0.5 percent of a total amount of money risked in game play not at a venue may be allocated to a bonus pool available at the venue. Players that play games at the venue may gain access to the bonus pool. Such players may play a bonus game (e.g., a game of a similar form to the other games, a game on a last event of a day that meets desired criteria) using earned bonus points. For example, a player may play a superfecta game on a last race of an evening at a race track using bonus points. A minimum and/or maximum amount of points may be required to play a bonus game (e.g., 2 dollars in bonus points). Bonus points may be earned from winning games earlier at the venue (e.g., earlier in the day, games that meet a characteristic). For example, an amount of money risked in gameplay may be earned by a player for each trifecta game won by the player that is played at the venue. Such point may be required to be used on the day that they are earned. Points may or may not be earned on an event on which a bonus game may be played (e.g., points may not be earned on a last event of a day, points earned on a last event of a day may be used at a later day even if points earned earlier in the day must be used on the last event of the day). Bonus points may carryover or expire each day or on any desired schedule. Unwon bonus pool money may carryover from day to day. At some point a bonus pool may pay out even without a traditional winning bonus game. For example, a payout may be made to players with a highest number of correct result (3 out of 4, 2 out of 3, etc.), all possible combinations may be issued as quick picks on a date of payoff (e.g., using the Meadowlands race with 495 $2.00 bonus bets to be made and 5040 possible combinations, a device may issue all the possible combinations to the 495 possible game players thereby guaranteeing a winner), and so on to facilitate payout on a date.

It will be understood that the technologies described herein for making, using, or practicing various embodiments are but a subset of the possible technologies that may be used for the same or similar purposes. The particular technologies described herein are not to be construed as limiting. Rather, various embodiments contemplate alternate technologies for making, using, or practicing various embodiments.

Modifications, additions, or omissions may be made to the method without departing from the scope of the invention. The method may include more, fewer, or other steps. Additionally, steps may be performed in any suitable order without departing from the scope of the invention.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure, as defined by the claims herein.

The following sections provide a guide to interpreting the present application.

II. Terms

The term "product" means any machine, manufacture and/or composition of matter, unless expressly specified otherwise.

The term "process" means any process, algorithm, method or the like, unless expressly specified otherwise.

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

The term "invention" and the like mean "the one or more inventions disclosed in this application", unless expressly specified otherwise.

The terms "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the disclosed invention(s)", unless expressly specified otherwise.

The term "variation" of an invention means an embodiment of the invention, unless expressly specified otherwise.

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not necessarily limited to", unless expressly specified otherwise. Thus, for example, the sentence "the portfolio includes a red widget and a blue widget" means the portfolio includes the red widget and the blue widget, but may include something else.

The term "consisting of" and variations thereof means "including and limited to", unless expressly specified otherwise. Thus, for example, the sentence "the portfolio consists of a red widget and a blue widget" means the portfolio includes the red widget and the blue widget, but does not include anything else.

The term "compose" and variations thereof means "to make up the constituent parts of, component of or member of", unless expressly specified otherwise. Thus, for example, the sentence "the red widget and the blue widget compose a portfolio" means the portfolio includes the red widget and the blue widget.

The term "exclusively compose" and variations thereof means "to make up exclusively the constituent parts of, to be the only components of or to be the only members of", unless expressly specified otherwise. Thus, for example, the sentence "the red widget and the blue widget exclusively compose a portfolio" means the portfolio consists of the red widget and the blue widget, and nothing else.

The terms "a", "an" and "the" mean "one or more", unless expressly specified otherwise.

The term "plurality" means "two or more", unless expressly specified otherwise.

The term "herein" means "in the present application, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase "at least one of a widget, a car and a wheel" means either (i) a widget, (ii) a car, (iii) a wheel, (iv) a widget and a car, (v) a widget and a wheel, (vi) a car and a wheel, or (vii) a widget, a car and a wheel. The phrase "at least one of", when such phrase modifies a plurality of things does not mean "one of each of" the plurality of things.

Numerical terms such as "one", "two", etc. when used as cardinal numbers to indicate quantity of something (e.g., one widget, two widgets), mean the quantity indicated by that numerical term, but do not mean at least the quantity indicated by that numerical term. For example, the phrase "one widget" does not mean "at least one widget", and therefore the phrase "one widget" does not cover, e.g., two widgets.

The phrase "based on" does not mean "based only on", unless expressly specified otherwise. In other words, the phrase "based on" describes both "based only on" and "based at least on". The phrase "based at least on" is equivalent to the phrase "based at least in part on".

The term "represent" and like terms are not exclusive, unless expressly specified otherwise. For example, the term "represents" does not mean "represents only", unless expressly specified otherwise. In other words, the phrase "the data represents a credit card number" describes both "the data represents only a credit card number" and "the data represents a credit card number and the data also represents something else".

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "e.g." and like terms mean "for example", and thus does not limit the term or phrase it explains. For example, in the sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other things besides "instructions" and "a data structure" can be "data".

The term "respective" and like terms mean "taken individually". Thus if two or more things have "respective" characteristics, then each such thing has its own characteristic, and these characteristics can be different from each other but need not be. For example, the phrase "each of two machines has a respective function" means that the first such machine has a function and the second such machine has a function as well. The function of the first machine may or may not be the same as the function of the second machine.

The term "i.e." and like terms mean "that is", and thus limits the term or phrase it explains. For example, in the sentence "the computer sends data (i.e., instructions) over the Internet", the term "i.e." explains that "instructions" are the "data" that the computer sends over the Internet.

Any given numerical range shall include whole and fractions of numbers within the range. For example, the range "1 to 10" shall be interpreted to specifically include whole numbers between 1 and 10 (e.g., 1, 2, 3, 4, . . . 9) and non-whole numbers (e.g. 1.1, 1.2, . . . 1.9).

Where two or more terms or phrases are synonymous (e.g., because of an explicit statement that the terms or phrases are synonymous), instances of one such term/phrase does not mean instances of another such term/phrase must have a different meaning. For example, where a statement renders the meaning of "including" to be synonymous with "including but not limited to", the mere usage of the phrase "including but not limited to" does not mean that the term "including" means something other than "including but not limited to".

III. Determining

The term "determining" and grammatical variants thereof (e.g., to determine a price, determining a value, determine an object which meets a certain criterion) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The term "determining" does not imply certainty or absolute precision, and therefore "determining" can include estimating, extrapolating, predicting, guessing and the like.

The term "determining" does not imply that mathematical processing must be performed, and does not imply that numerical methods must be used, and does not imply that an algorithm or process is used.

The term "determining" does not imply that any particular device must be used. For example, a computer need not necessarily perform the determining.

IV. Forms of Sentences

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device, article or other product is described herein, more than one device/article (whether or not they cooperate) may alternatively be used in place of the single device/article that is described. Accordingly, the functionality that is described as being possessed by a device may alternatively be possessed by more than one device/article (whether or not they cooperate).

Similarly, where more than one device, article or other product is described herein (whether or not they cooperate), a single device/article may alternatively be used in place of the more than one device or article that is described. For example, a plurality of computer-based devices may be substituted with a single computer-based device. Accordingly, the various functionality that is described as being possessed by more than one device or article may alternatively be possessed by a single device/article.

The functionality and/or the features of a single device that is described may be alternatively embodied by one or more other devices which are described but are not explicitly described as having such functionality/features. Thus, other embodiments need not include the described device itself, but rather can include the one or more other devices which would, in those other embodiments, have such functionality/features.

V. Disclosed Examples and Terminology are not Limiting

Neither the Title (set forth at the beginning of the first page of the present application) nor the Abstract (set forth at the end of the present application) is to be taken as limiting in any way as the scope of the disclosed invention(s), is to be used in interpreting the meaning of any claim or is to be used in limiting the scope of any claim. An Abstract has been included in this application merely because an Abstract is required under 37 C.F.R. § 1.72(b).

The title of the present application and headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

Though an embodiment may be disclosed as including several features, other embodiments of the invention may include fewer than all such features. Thus, for example, a claim may be directed to less than the entire set of features in a disclosed embodiment, and such claim would not include features beyond those features that the claim expressly recites.

No embodiment of method steps or product elements described in the present application constitutes the invention claimed herein, or is essential to the invention claimed herein, or is coextensive with the invention claimed herein, except where it is either expressly stated to be so in this specification or expressly recited in a claim.

The preambles of the claims that follow recite purposes, benefits and possible uses of the claimed invention only and do not limit the claimed invention.

The present disclosure is not a literal description of all embodiments of the invention(s). Also, the present disclosure is not a listing of features of the invention(s) which must be present in all embodiments.

All disclosed embodiment are not necessarily covered by the claims (even including all pending, amended, issued and canceled claims). In addition, an embodiment may be (but need not necessarily be) covered by several claims. Accordingly, where a claim (regardless of whether pending, amended, issued or canceled) is directed to a particular embodiment, such is not evidence that the scope of other claims do not also cover that embodiment.

Devices that are described as in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for long period of time (e.g. weeks at a time). In addition, devices that are in communication with each other may communicate directly or indirectly through one or more intermediaries.

A description of an embodiment with several components or features does not imply that all or even any of such components/features are required. On the contrary, a variety of optional components are described to illustrate the wide variety of possible embodiments of the present invention(s). Unless otherwise specified explicitly, no component/feature is essential or required.

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention(s), and does not imply that the illustrated process is preferred.

Although a process may be described as including a plurality of steps, that does not imply that all or any of the steps are preferred, essential or required. Various other embodiments within the scope of the described invention(s) include other processes that omit some or all of the described steps. Unless otherwise specified explicitly, no step is essential or required.

Although a process may be described singly or without reference to other products or methods, in an embodiment the process may interact with other products or methods. For example, such interaction may include linking one business model to another business model. Such interaction may be provided to enhance the flexibility or desirability of the process.

Although a product may be described as including a plurality of components, aspects, qualities, characteristics and/or features, that does not indicate that any or all of the plurality are preferred, essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

An enumerated list of items (which may or may not be numbered) does not imply that any or all of the items are equivalent to each other or readily substituted for each other.

All embodiments are illustrative, and do not imply that the invention or any embodiments were made or performed, as the case may be.

VI. Computing

It will be readily apparent to one of ordinary skill in the art that the various processes described herein may be implemented by, e.g., appropriately programmed general purpose computers, special purpose computers and computing devices. Typically a processor (e.g., one or more microprocessors, one or more microcontrollers, one or more digital signal processors) will receive instructions (e.g., from a memory or like device), and execute those instructions, thereby performing one or more processes defined by those instructions. Instructions may be embodied in, e.g., one or more computer programs, one or more scripts.

A "processor" means one or more microprocessors, central processing units (CPUs), computing devices, microcontrollers, digital signal processors, or like devices or any combination thereof, regardless of the architecture (e.g., chip-level multiprocessing/multi-core, RISC, CISC, Microprocessor without Interlocked Pipeline Stages, pipelining configuration, simultaneous multithreading).

Thus a description of a process is likewise a description of an apparatus for performing the process. The apparatus that performs the process can include, e.g., a processor and those input devices and output devices that are appropriate to perform the process.

Further, programs that implement such methods (as well as other types of data) may be stored and transmitted using a variety of media (e.g., computer readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only.

The term "computer-readable medium" refers to any medium, a plurality of the same, or a combination of different media that participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE 802.3), SAP, ATP, Bluetooth®, and TCP/IP, TDMA, CDMA, and 3G; and/or (iv) encrypted to ensure privacy or prevent fraud in any of a variety of ways well known in the art.

Thus a description of a process is likewise a description of a computer-readable medium storing a program for performing the process. The computer-readable medium can store (in any appropriate format) those program elements which are appropriate to perform the method.

Just as the description of various steps in a process does not indicate that all the described steps are required, embodiments of an apparatus include a computer/computing device operable to perform some (but not necessarily all) of the described process.

Likewise, just as the description of various steps in a process does not indicate that all the described steps are required, embodiments of a computer-readable medium storing a program or data structure include a computer-readable medium storing a program that, when executed, can cause a processor to perform some (but not necessarily all) of the described process.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device which accesses data in such a database.

Various embodiments can be configured to work in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, a combination of any of the above). Each of the devices may themselves comprise computers or other computing devices, such as those based on the Intel® Pentium® or Centrino™ processor, that are adapted to communicate with the computer. Any number and type of devices may be in communication with the computer.

In an embodiment, a server computer or centralized authority may not be necessary or desirable. For example, the present invention may, in an embodiment, be practiced on one or more devices without a central authority. In such an embodiment, any functions described herein as performed by the server computer or data described as stored on the server computer may instead be performed by or stored on one or more such devices.

Where a process is described, in an embodiment the process may operate without any user intervention. In another embodiment, the process includes some human intervention (e.g., a step is performed by or with the assistance of a human).

VII. Continuing Applications

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application.

Applicants intend to file additional applications to pursue patents for subject matter that has been disclosed and enabled but not claimed in the present application.

VIII. 35 U.S.C. § 112, Paragraph 6

In a claim, a limitation of the claim which includes the phrase “means for” or the phrase “step for” means that 35 U.S.C. § 112, paragraph 6, applies to that limitation.

In a claim, a limitation of the claim which does not include the phrase “means for” or the phrase “step for” means that 35 U.S.C. § 112, paragraph 6 does not apply to that limitation, regardless of whether that limitation recites a function without recitation of structure, material or acts for performing that function. For example, in a claim, the mere use of the phrase “step of” or the phrase “steps of” in referring to one or more steps of the claim or of another claim does not mean that 35 U.S.C. § 112, paragraph 6, applies to that step(s).

With respect to a means or a step for performing a specified function in accordance with 35 U.S.C. § 112, paragraph 6, the corresponding structure, material or acts described in the specification, and equivalents thereof, may perform additional functions as well as the specified function.

Computers, processors, computing devices and like products are structures that can perform a wide variety of functions. Such products can be operable to perform a specified function by executing one or more programs, such as a program stored in a memory device of that product or in a memory device which that product accesses. Unless expressly specified otherwise, such a program need not be based on any particular algorithm, such as any particular algorithm that might be disclosed in the present application. It is well known to one of ordinary skill in the art that a specified function may be implemented via different algorithms, and any of a number of different algorithms would be a mere design choice for carrying out the specified function.

Therefore, with respect to a means or a step for performing a specified function in accordance with 35 U.S.C. § 112, paragraph 6, structure corresponding to a specified function includes any product programmed to perform the specified function. Such structure includes programmed products which perform the function, regardless of whether such product is programmed with (i) a disclosed algorithm for performing the function, (ii) an algorithm that is similar to a disclosed algorithm, or (iii) a different algorithm for performing the function.

Where there is recited a means for performing a function that is a method, one structure for performing this method includes a computing device (e.g., a general purpose computer) that is programmed and/or configured with appropriate hardware to perform that function.

Also included is a computing device (e.g., a general purpose computer) that is programmed and/or configured with appropriate hardware to perform that function via other algorithms as would be understood by one of ordinary skill in the art.

IX. Disclaimer

Numerous references to a particular embodiment do not indicate a disclaimer or disavowal of additional, different embodiments, and similarly references to the description of embodiments which all include a particular feature do not indicate a disclaimer or disavowal of embodiments which do not include that particular feature. A clear disclaimer or disavowal in the present application shall be prefaced by the phrase "does not include" or by the phrase "cannot perform".

What is claimed is:

1. A method for administering games of chance that are based on one or more events at a venue, wherein players of the games are using computing devices to place wagers on the games played, the method comprising:

receiving the wagers from at least a first network and a second network by a totalizer;

allocating a portion of money from the wagers that are received from the first network to a bonus pool based at least in part on source of the games played, amount risked in the games, and riskiness of games and types of games;

allocating bonus currency to a plurality of players associated with wagers that are received from the second network, wherein the bonus currency is usable to play a bonus game, at least part of the bonus pool is winnable from play of the bonus game, and the bonus game is administered as a last of the one or more events held at the venue during a predetermined time period; and playing the bonus game using a wager of the bonus currency from the plurality of players associated with the wagers from the second network, wherein the wager of the bonus currency identifies a winning condition of a second of the one or more events held at the venue, wherein the wager of the bonus currency wins the money from the bonus pool if the winning condition occurs in the second of the one or more events, an amount of the bonus currency allocated to the plurality of players associated with the second network is proportional to a risk type of the wager, the bonus currency is not exchangeable for a monetary value, and an interest in the bonus pool is distributed (1) in its entirety to the plurality of players who won the bonus game, and (2) as a portion to the plurality of players who won the bonus game, and a remainder portion not won is set to expire after the last of the one or more events, such that the remainder portion of the bonus currency has no value after the last of the one or more events.

2. The method of claim 1, wherein the wager of the bonus currency is that the winning condition of the one or more events of the bonus game will occur, wherein the winning condition includes at least one guess at a winner of a race.

3. The method of claim 1, further comprising: determining a date at which the bonus currency expires if the bonus currency is not used.

4. The method of claim 1, further comprising:

determining eligibility of the second of the one or more events to be a basis of the bonus game; and when eligible, allowing use of the bonus currency to play the bonus game on the second of the one or more events.

5. The method of claim 4, wherein when the second of the one or more events is eligible for the bonus game and the second of the one or more events is a last of the one or more events of a day held at the venue, further comprising: preventing use of the bonus currency on other events of the day.

6. The method of claim 4, further comprising:

when no one wins the bonus game based on the second of the one or more events, carrying forward a balance of the bonus pool to a future event on which a future bonus game may be based.

7. The method of claim 6, further comprising:

determining that the bonus pool must be won on the future event;

determining that no one wins a given bonus game based on the future event; and awarding the bonus pool to at least one of the plurality of players of the given bonus game based on the future event that did not win.

8. The method of claim 4, wherein only the bonus game is played based on the second of the one or more events with the bonus currency.

9. The method of claim 1, further comprising: requiring that the wager have a particular risk characteristic.

10. The method of claim 9, wherein the particular risk characteristic includes a superfecta wager.

11. The method of claim 1, wherein a plurality of players associated with the wagers that are received from the first network, are not allocated any bonus currency.

12. The method of claim 1, wherein no portion of the money is allocated to the bonus pool the plurality of players associated with the wagers that are received from the second network.

13. The method of claim 1, wherein the bonus currency includes points usable to play the bonus game.

14. The method of claim 1, wherein the games are one or more horse races run at the venue.

15. The method of claim 1, wherein the portion of the money differs for each game based on a riskiness of each game.

16. An apparatus for administering games of chance that are based on one or more events at a venue, wherein players of the games are using computing devices to place wagers on the games played, the apparatus comprising:

a totalizer configured to receive the wagers; and a processor configured to:

receive the wagers from at least a first network and a second network by the totalizer;

allocate a portion of money from the wagers that are received by the first network to a bonus pool, based at least in part on location of the venue, source of the games played, amount risked in the games, and riskiness of games and types of games;

allocate bonus currency to a plurality of players associated with wagers that are received from the second network, wherein the bonus currency is usable to play a bonus game, at least part of the bonus pool is winnable from play of the bonus game, and the bonus game is administered as a last of the one or more events held at the venue during a predetermined time period; and play the bonus game using a wager of the bonus currency from the plurality of players associated with the wagers from the second network, wherein the wager of the bonus currency identifies a winning condition of a second of the one or more events held at the venue, wherein the wager of the bonus currency wins the money from the bonus pool if the winning condition occurs in the second of the one or more events, an amount of the bonus currency allocated to the plurality of players associated with the second network is proportional to a risk type of the wager, the bonus currency is not exchangeable for a monetary value, and an interest in the bonus pool is distributed (1) in its entirety to the plurality of players who won the bonus game, and (2) as a portion to the plurality of players who won the bonus game, and a remainder portion not won is set to expire after the last of the one or more events, such that the remainder portion of the bonus currency has no value after the last of the one or more events.

* * * * *